United States Patent
Harter et al.

(10) Patent No.: US 7,890,650 B2
(45) Date of Patent: Feb. 15, 2011

(54) METHOD AND DEVICE FOR TRANSMITTING INFORMATION IN A NETWORK, AS WELL AS A CORRESPONDING NETWORK

(75) Inventors: Werner Harter, Illingen (DE); Eberhard Boehl, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 2563 days.

(21) Appl. No.: 10/444,468

(22) Filed: May 22, 2003

(65) Prior Publication Data

US 2004/0073698 A1 Apr. 15, 2004

(30) Foreign Application Priority Data

May 22, 2002 (DE) ................... 102 23 007

(51) Int. Cl.
*G06F 15/16* (2006.01)
(52) U.S. Cl. ............... 709/236; 709/231; 709/232; 709/238
(58) Field of Classification Search ........... 709/236, 709/238, 251, 208, 224, 231–232
See application file for complete search history.

(56) References Cited

U.S. PATENT DOCUMENTS

| | | | | |
|---|---|---|---|---|
| 4,354,229 A | * | 10/1982 | Davis et al. | 710/104 |
| 5,600,657 A | * | 2/1997 | Orita | 714/717 |
| 5,940,367 A | * | 8/1999 | Antonov | 370/218 |
| 6,065,052 A | * | 5/2000 | Van Loo | 709/224 |
| 6,785,226 B1 | * | 8/2004 | Oltman et al. | 370/228 |
| 6,836,514 B2 | * | 12/2004 | Gandhi et al. | 375/240.27 |
| 7,046,929 B1 | * | 5/2006 | Hester et al. | 398/17 |
| 2002/0027877 A1 | * | 3/2002 | Son et al. | 370/218 |
| 2002/0112077 A1 | * | 8/2002 | Semaan et al. | 709/245 |

FOREIGN PATENT DOCUMENTS

| | | |
|---|---|---|
| DE | 196 33 744 | 2/1998 |
| GB | 2 028 062 | 2/1980 |

OTHER PUBLICATIONS

X-by-Wire—Die sichere Alternative", [x-by-Wire—The reliable Alternative"] from Auto- und Elektronik [Auto and Electronics] Feb. 2000, pp. 73-75.

* cited by examiner

*Primary Examiner*—William C Vaughn, Jr.
*Assistant Examiner*—Mohamed Ibrahim
(74) *Attorney, Agent, or Firm*—Kenyon & Kenyon LLP

(57) ABSTRACT

A method and a device for transmitting information in a network having at least three subscribers, as well as a corresponding network, the information being transmitted in at least a first frame of a predefined length and structure, and the first frame on a first transmission path being transmitted in a loop to the next, second subscriber in each instance, given a predefined transmission direction, the information being additionally transmitted in a second frame having the same length and structure as the first frame, the second frame on a second transmission path being transmitted to a one-after-the-next, third subscriber, the second transmission path and, thus, the second frame skipping the second subscriber, and an assessment being made in dependence upon at least one criterion, thus information, length or structure.

19 Claims, 3 Drawing Sheets

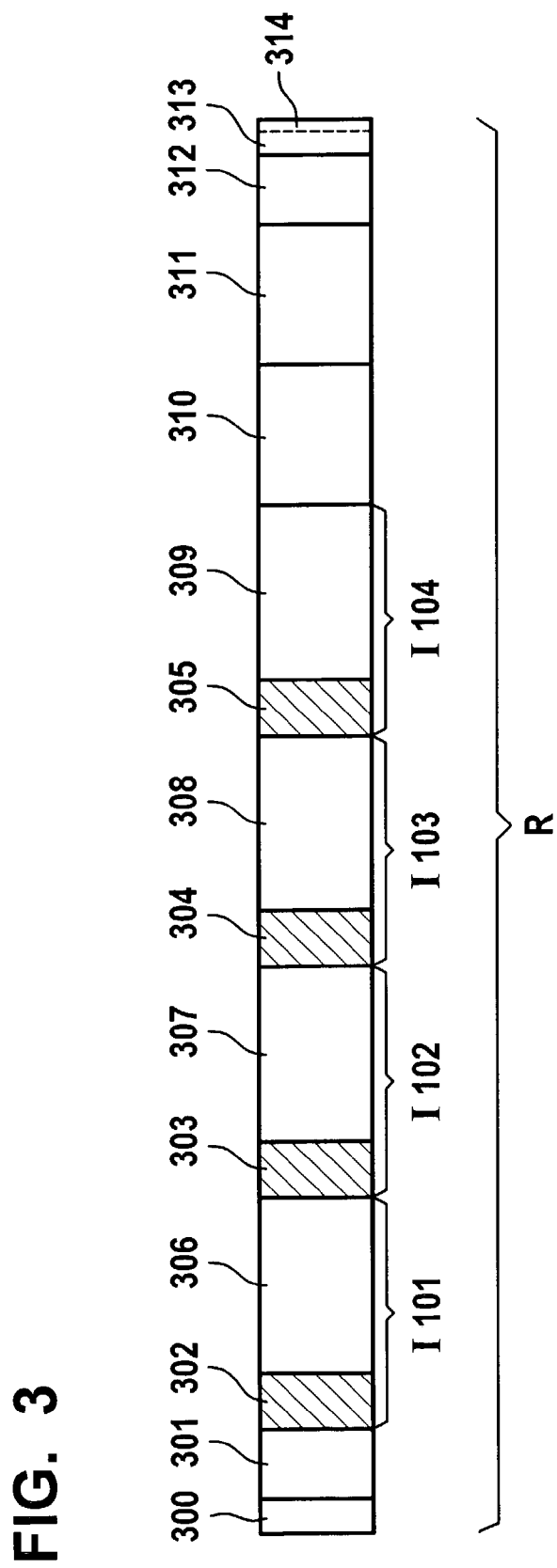

METHOD AND DEVICE FOR TRANSMITTING INFORMATION IN A NETWORK, AS WELL AS A CORRESPONDING NETWORK

FIELD OF THE INVENTION

The present invention relates to a method and a device for transmitting information in a network, as well as to a corresponding network having at least three subscribers, the information being transmitted in at least a first frame of a predefined length and structure.

BACKGROUND INFORMATION

In distributed, in particular safety-related systems or networks, a data exchange among the participating subscribers is needed to enable reliable decisions or assessments to be made, even in the event of an error. This means that the error must be reliably recognized, and appropriate measures must be introduced to avoid a degradation of safety or system failure.

Such distributed safety-related systems are known from the vehicle sector as x-by-wire systems. A most important objective in this context is to ensure the functional reliability of such systems. This is described in the article "X-by-Wire—Die sichere Alternative", from Auto-und Elektronik 2/2000 on pages 73 through 75.

Typically, the information, in particular the data among the subscribers, is exchanged through direct connections to all subscribers. Here, the networks, in particular the underlying bus systems, generally have a redundant design, which leads to substantial outlay and limited flexibility.

Thus, the related art has not been able to yield optimum results in all regards. It is, therefore, the object of the present invention to devise a method and a device for transmitting information in a network which, on the one hand, permits optimal, safety-related decisions and assessments to be made, and, on the other hand, entails a reduced outlay, in particular a reduced number of transmission paths, while providing a high degree of flexibility.

SUMMARY OF THE INVENTION

For that purpose, one starts out from a method and a device for transmitting information in a network having at least three subscribers, the information being transmitted in at least a first frame of a predefined length and structure, and the first frame on a first transmission path being transmitted in a loop to the next, second subscriber in each instance, given a predefined transmission direction, the information being additionally advantageously transmitted in a second frame having the same length and structure as the first frame, the second frame on a second transmission path being transmitted to a one-after-the-next, third subscriber, the second transmission path and, thus, the second frame skipping the second subscriber, and an assessment being made in dependence upon at least one criterion, thus information, length or structure. The second frame may be identical to the first, but the transmission path is a different one.

Thus, an annular structure is proposed, for each subscriber or network node, at least two inputs, thus from the predecessor and from its predecessor, in turn, being provided. The subscriber, which receives the transmitted information via these two inputs, in two frames, then automatically recognizes (e.g., by comparing the information, in particular the data contents, examining the structure and/or the length of the frame) whether the transmitted information, in particular the data from at least one predecessor, is valid or whether it contains errors. In dependence upon this evaluation, in particular in response to detection of an error, measures may then be introduced, such as switching to another input or blocking the faulty input. In the process, the number of inputs to be considered may be specified, in particular programmed. Through the use of a ring-type data transmission, the method according to the present invention and the device according to the present invention reduce the number of connections or transmission paths considerably.

The frames each expediently contain first informational fields, which correspond to the number of subscribers in the network, a first informational field being uniquely assigned to each subscriber. This means that, within one frame, thus one information frame, each subscriber is assigned one field or a specific position, which, in a subsequent form, facilitates a comparison of information from two frames.

The information is effectively differentiated as data information and validity information, given existing validity information and lack of or implausible data information, the presence of errors being decided during the evaluation.

In addition, it is practical that the structure and/or the length of a frame are/is compared to a predefined structure and/or length, in response to a deviation, the presence of errors being decided.

At least one of the data, thus information, length or structure, in the first frame and one in the second frame are at least partially compared to one another for purposes of the evaluation, and the presence of errors is decided when they do not conform in the compared subframes. In this context, it is useful to compare those subframes which had also been transmitted via all considered transmission paths.

In one advantageous embodiment, the information is transmitted in a bifrequency coding, so that, independently of the content of the information, signals are continually transmitted on the network, and in response to the absence of the signals or nonconformance of the signals to the code on at least one transmission path, the presence of errors is decided. In place of the bifrequency coding, any other code may be used which, independently of the data content, leads to constantly changing signals. Thus, for example, block codes may also be used which replace a certain number of data bits i with a higher number of code bits j in such a way that both signal levels are present in each code word. At i=5 and j=6, one obtains the known 5B/6B code. In the same way, an 8B/1OB code may be used. These codes have the advantage over the bifrequency code of featuring less code redundancy and of facilitating a lower network activity through appropriate selection of the code words. Through the selection of such a coding (bifrequency code or suitable block code), each network subscriber is able to recover the clock pulse from the data, and the processing is able to be carried out in synchronism with this clock pulse. This eliminates the need for sampling the data using a higher clock frequency.

At this point, in response to a decision that errors are present, at least one appropriate measure is expediently introduced. This may be, for example, to switch off or block a subscriber's information input from a transmission path that had been recognized as being faulty, allowing the information and the frame to only be transmitted over the other transmission path. Equally, the information coming in via the transmission path, identified as being faulty, i.e., the corresponding frame, may also be discarded in the subscriber itself, as faulty information.

In one advantageous embodiment, to identify an error, thus for evaluation purposes, a functional test is performed by at least one subscriber, at least one subscriber being predefined as a faulty subscriber in that at least one of the data, thus information, structure or length, being transmitted as an at least partially altered datum and by the subscriber predefined as the faulty subscriber. In response to the expected error, it is then possible to check whether the adequate measure is introduced.

One embodiment provides for a subscriber which exercises a master function, thus controlling the transmission of the information in the network, in that it generates at least one frame, typically by specifying informational fields and/or time slots based on its own clock pulse. If it is decided or recognized at this point that an error is present in the master, then the subscriber next to follow the master may advantageously assume the master function, provided that it either has its own basic clock pulse (e.g., due to a connected quartz oscillator) or is able to take over such a clock pulse from an application linked to the output interface. Should the master fail, then there is either no or only a reduced network activity, for as long as there is no new master.

Each frame expediently contains a piece of identifier information which uniquely characterizes the frame, redundant frames, which are transmitted via various transmission paths, having the same identifier.

The information likewise includes at least control information and data information, the control information being used to control the transmission of the frames. Due to the fact that control information may be transmitted along with, the need is advantageously eliminated for an additional reset line or additional control lines, as well as for synchronizing the internal counters, which are used as time bases for the subscribers. In addition, the information expediently includes at least status information which describes the network status, the status information corresponding either to the active network status or being based on the corresponding frame. This status information may then effectively correspond to at least one piece of connection information or contain the same, which represents or contains the status of a specifically predefinable transmission path, in particular of the transmission path via which the corresponding frame was transmitted.

In another advantageous embodiment, given at least four subscribers, a third frame having the same length and structure as the two first frames is transmitted, the fourth subscriber receiving a transmission of the first frame from the third subscriber, the second frame from the second subscriber, and the third subscriber from the first subscriber; and at the second frame, the third subscriber is skipped, and at the third frame, the second and third subscribers are skipped. To describe this refinement in general terms, given N subscribers, K transmission paths and thus K inputs of a subscriber are provided, and thus also given a specific number of errors, there may be a certain assessment and decision, as well as reliable reaction.

BRIEF DESCRIPTION OF THE DRAWINGS

FIG. 3 shows exemplarily, one frame for transmitting information, as well as informational fields contained therein.

DETAILED DESCRIPTION

Figure 1:
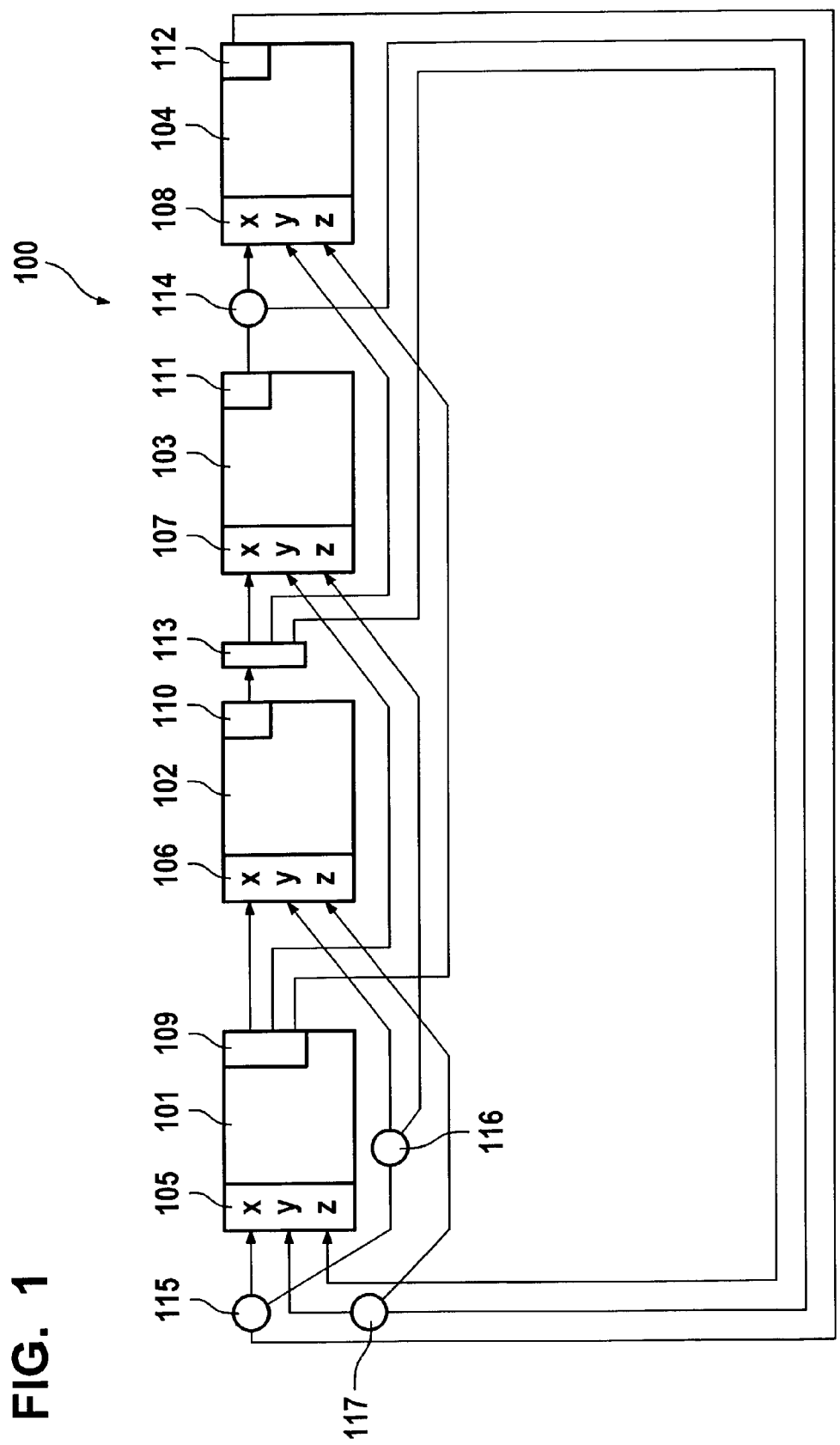
FIG. 1 shows a network according to the present invention having four subscribers.

FIG. 1 shows a network according to the present invention having subscribers 101 through 104. Illustrated within these are input interfaces 105 through 108, each having three inputs X, Y and Z. Likewise shown are output interfaces 109 through 112 in each subscriber. In this context, corresponding to each input X, Y, Z of input interfaces 105 through 108 is one transmission path, which, for that reason, was not referred to separately; but rather bears the same designation as the particular input interface, thus, for example, 1O5X or 107Z.

The information is transmitted via output interfaces 109 through 112, various configurations being possible. Interface 109 is so conceived that it offers three output interfaces in the very frame of transmission paths 106X, 107Y and 108Z, i.e., that a division or definition of three transmission frames is already made in the subscriber, in particular in interface 109. In this context, it is possible, for example, even when working with relatively long transmission paths, to perform a signal or level adaptation with respect to the frames which are transmitted over these relatively long transmission paths. Interface 110, in conjunction with branch element 113, shows another possible configuration. In this context, the information is transmitted in the frame from 110 to 113, and the frame is divided, doubled, or tripled in element 113 with respect to transmission paths 107X, 108Y and 105Z. This means a simple subscriber having a simple output interface 110 may be employed, and, to the extent needed, a signal adaptation or amplification may be carried out via branch element 113. In one simple preferred case, this branch element is merely designed, however, as a simple line interface 114. This means the information is transmitted in the frames from interface 111, and a branching of the signal merely takes place via 114 to transmission path 105Y and again via element 117 to transmission path 106Z. This means, in the simplest case, the signals are merely split over the three transmission paths. Thus, a first frame is transmitted via inputs X, a second frame via inputs Y, and a third frame via inputs Z.

For purposes of a simplified representation, simple branch elements are also generally shown as 115 and 116, the illustrated output interface variations each being able to be employed universally or in any combination.

Figure 2:
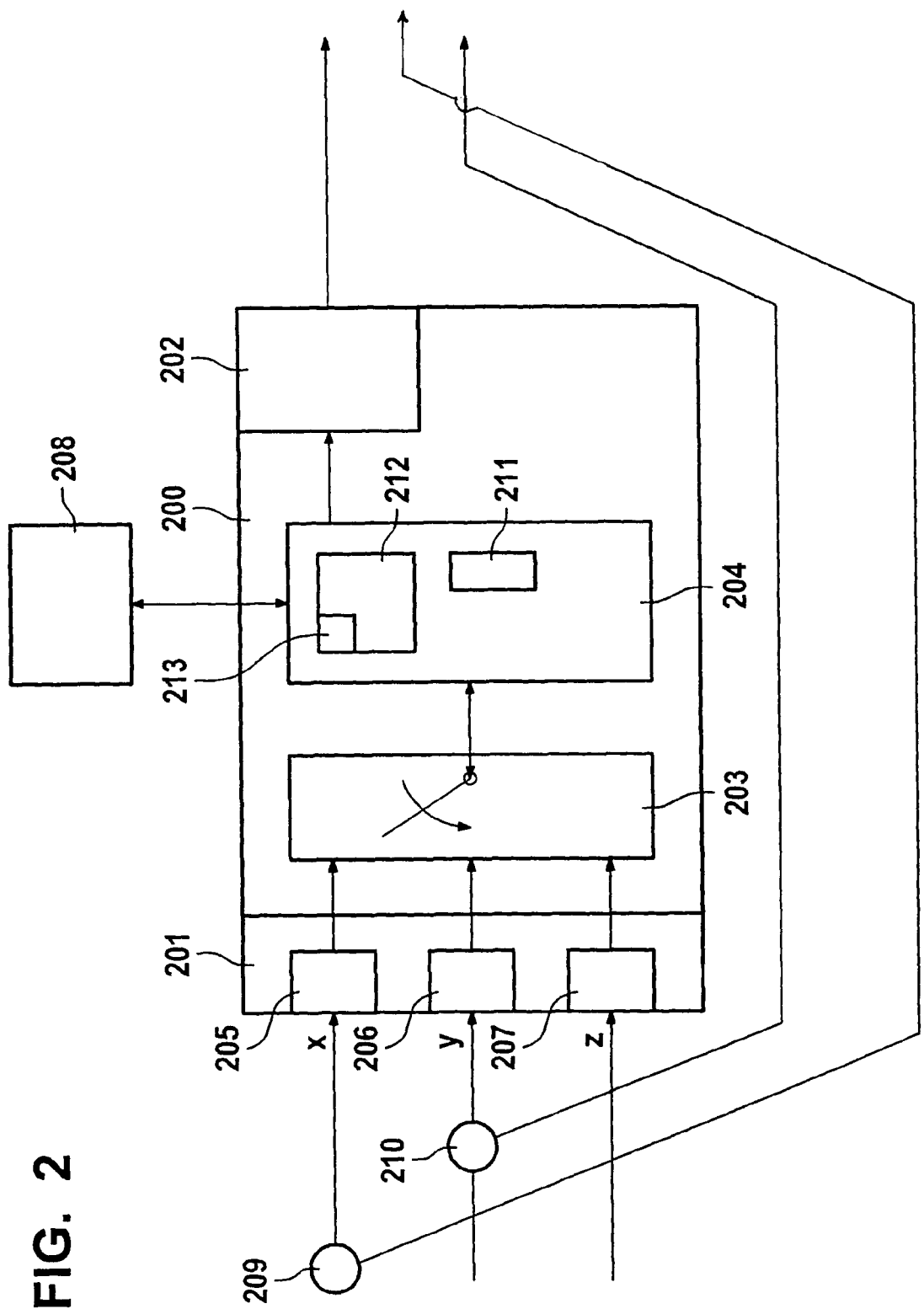
FIG. 2 shows in detail, by way of example, one subscriber having three transmission paths.

FIG. 2 shows an individual subscriber 200 of such a network having three transmission paths 201X, 201Y and 200Z, the input interface being shown, in turn, as 201. 209 and 210 again denote branch elements, as previously described. As an output interface, an element 202 is shown. The transmission paths lead into three inputs X, Y, Z, each having an assigned receiver 205, 206, and 207. The received information or the received frames are then supplied to a selection device 203, which, on the one hand, selectively routes the frames or the corresponding information to the data memory having data analysis or evaluation 204. For purposes of a simplified representation, only a block 204 is shown as a memory and evaluation device. However, they may likewise be separate devices. Evaluation device 204 routes, on the one hand, the appropriate information, i.e., a frame to output interface 202, and, on the other hand, a result of the evaluation to an element 208, which equally represents a separate component, software, or subprogram, i.e., an application. 212 represents a processor unit or microcomputer unit for processing; 211 a memory element. Optionally included is an element 213, an internal time base from which a clock pulse may be generated. If a subscriber has a master function assigned to it, thus this subscriber controls the transmission in the network, then, on the basis of this internal clock pulse, a network clock pulse may be preset, so that a frame for transmission purposes having various informational fields may be derived from this clock pulse, and all other network subscribers may recover their clock pulse from the data signal.

Such a frame is illustrated in FIG. 3 and denoted by R. Various informational fields 300 through 313 are shown. These informational fields contain, for example, binary information in bit or byte form. Informational fields are shown which are able to be uniquely assigned to one subscriber. For subscribers 101 through 104, these are fields I 101 through I 104, the sequence being arbitrary and exemplary. The illustrated exemplary frame R contains informational fields 302 through 305 in which validity information, in particular subscriber status information, may be stored. These validity information fields show, for example, the type and validity of the information, in particular of the data in subsequent fields 306 through 309, one validity field and one data field each being permanently assigned to a subscriber. Also contained in the frame is an identifier field 300 in which identifier information pertaining to the frame is stored. In other words, a frame is characterized by the identifier or identifier information 300, in one exemplary embodiment, the same frames, which are transmitted over different transmission paths, including the same identifiers; in some circumstances, including different identifiers which may, in fact, be assigned to one another, but, at the same time, to the transmission path. Field 301 contains, for example, status information on the network. Block 310 contains, for example, a reserved field for supplemental information. In informational field 311, information is stored, for example, regarding a consistency check of the frame, thus, for example, control bytes pertaining to a cyclic redundancy check or also for clock-pulse and length checking of the frame, as well as of the frame-position monitoring. In block 312, control information is stored which enables, in particular, the master to control the transmission of the information. In addition, in block 313, for example, the information previously mentioned also with regard to block 311, is stored for the length and structure checking of frame R, with block 314 as an example, a parity bit being added as an additional checking and evaluation measure.

The frame structure just described is merely to be regarded as exemplary. In accordance with the present invention, another frame structure is also possible and usable depending on the application according to the present invention. The same holds for the information transmitted in the frame.

A method of functioning in accordance with the present invention with regard to such an evaluation or voting structure for distributed and, in this case, multiply redundant systems is described in the following. For this, the information, in particular the data or data information, is transmitted serially in the network in a frame having a preset, in particular fixed number of binary information, in particular bytes. Each subscriber of the network has uniquely assigned to it, in particular in accordance with its position, an informational field, composed in particular of a validity field and data field. A subscriber, in particular subscriber 101, functions as a master, thus exercises the master function, in other words, controls the entire information transfer. For this, the system clock pulse is derived from the clock-pulse generator of the master, and, on the basis of its internal clock pulse, this master generates the system clock pulse and thus the frame for transmitting information.

The information may be transmitted in parallel, because in this embodiment, each subscriber has a fixed position in the frame assigned to it for transmitting its data information or status or validity information 302 through 305.

Three inputs are shown in FIG. 1. This number may vary, depending on the total number of subscribers, for redundancy reasons, it being necessary to provide at least two inputs, and thus two separate transmission paths. Thus, for example, subscriber 101 transmits a first frame from interface 109 via transmission path 106X to the corresponding input of subscriber 102. A second frame having corresponding information is then transmitted via transmission path 107Y to subscriber 103, i.e., the frame and the information contained therein skips subscriber 102. The first frame is received via transmission path 106X by subscriber 102 and, with data possibly being added thereto, is transmitted to subscriber 103. Thus, subscriber 103 contains a first frame having corresponding information via input 107X, as well as a second frame having substantially the same information via input 107Y. The sole distinction between the two frames is that subscriber 102 possibly modified or added data pertaining to it in the relevant informational field.

The evaluation itself, thus the voting, may now be undertaken in subscriber 103 by the controller, (comparable to 212) in the data evaluation module (comparable to 204). In the process, different errors may now be recognized. The one group of errors may be uncovered by examining a frame, in that consistency checks are performed within the frame interrelated or interdependent data or information. A second group of errors may be detected, for example, in that the first and the second frame, thus, as in the example, as input via 107X and 107Y, or the informational items contained therein are at least partially compared to one another and checked for conformity.

The details to be checked in this context relate, on the one hand, to the transferred information, and/or to the length of the frame or the contained information, and/or to the structure of the frame.

With respect to the information, every error may be reliably detected in a comparison operation, the exception being in informational field I102, since the first frame may include modified data in this field, as subscriber 102 is able to intervene in this field. All remaining informational fields, thus all those in which subscriber 102 is not able to make any changes, must be the same with respect to the first frame, via 107X, and the second frame, via 107Y. In this case, a deviation is indicative of an error. In the same way, frames R themselves, as the first and second frames, must have the same construction with respect to their length and structure, thus with respect to informational fields 300 through 313, and deviations arising in a comparison of both frames, likewise lead to a decision that errors exist. Contained therein are also clock-pulse errors, since they directly affect either the structure and/or the length of the frame. Thus, a comparison may be made among the redundant frames, in particular among the informational items contained therein, especially the data possibly received with a delay via different transmission paths. Due to the fact that the data are immediately available, substantially as redundant data, the certainty is enhanced that a further time loss does not follow as the result of switching over in the event of an error.

As a result of this possible time lag between two redundant frames, in one embodiment according to the present invention, an assignable same identifier information is stored in the frame. This means, for example, in preamble 300, thus in the identifier field which includes, for example, one byte, the first 6 bits are used for assigning the redundant frames to one another, thus the first and second frames may be assigned to one another; thus, these first six bits are the same, to distinguish the two redundant frames from other frames. The other two bits are used, for example, for distinguishing the first frame, via transmission path 106X or 107X, from the second frame, via transmission path 107Y. Thus, the frames may, in fact, be uniquely assigned to one another, the transmission paths being nevertheless ascertainable, thereby enabling a blocking in the event of an error in the correct transmission path or the corresponding input. This identification renders possible the synchronization to a result to be evaluated, moreover, on the basis of the subscriber's position in the network, given a unique allocation, it being possible to establish a unique time reference, in particular to the master. In the same way, the decision that errors are present may be made by checking for consistency in the frame itself. This may be accomplished once in that transmitted information and/or structure of the frame and/or length of the frame or clock pulse in the frame in the evaluating subscriber are already predefined, thus known, and the mentioned aspects, thus information and/or structure and/or length of the frame are compared in this regard to the already predefined values, and, in the context of an adjustment, the existence of errors is decided.

In addition, evaluations are possible due to mutually dependent information and/or structure and/or length in the frame itself, since, for example, structure and/or length information, as previously mentioned in block 310 or 313, is contained in the frame. This means that if the actual structure or parts of it do not correspond or do not correspond in part to the structure information as contained in the frame, the decision may be made that errors exist. The same applies to the information itself, such as test information, for example the control bytes of a cyclic redundancy check with respect to informational components of the frame. The same applies to a parity check, for example using a parity bit, as shown in block 314. A clock-pulse deviation in the frame or a frame-position deviation may also be recognized by an appropriate monitoring. Node-internal errors, for example when the data information in block 307 does not correspond with the type information and validity information in block 303, this leads to a decision that errors exist. If, for example, it is indicated by validity information in block 303 that data are contained in block 307, but these data are missing, then the decision is made that errors exist. The same applies when the type of data present in block 303 are encoded data, and they do not conform with the actual data or the actual data information in block 307, then the decision is likewise made that errors exist. Due to the then lacking data and validity input, the node that is not able to be evaluated or which is faulty, is then recognized from among all the others. Another possibility for evaluation or for deciding on the existence of errors is to transmit the data or the information in a bifrequency coding. In this context, bifrequency coding or biphase coding means that each data bit has an assigned time interval which begins with a transition, in particular between two levels, and ends with a transition between these two levels. If there is another transition within this time interval, then the corresponding data bit is to be interpreted within the framework of the coding as 1, otherwise as 0. Thus, the clock-pulse information and the information itself, thus in particular data information, may be encoded with one another. If the information is transmitted in such a form as encoded information, then independently of the information itself, thus of the information content, there is continuing or lasting activity on the transmission paths or on the network. If the lack of this bifrequency coding is recognized then on at least one transmission path, then, in this case, the existence of errors may likewise be decided.

The known test measures may be used individually or in any combination within the scope of the evaluation to decide upon the existence of errors, thereby enabling redundancy to additionally be achieved. These evaluation mechanisms make it additionally possible to recognize defective transmission paths and subscribers very quickly, in particular through bifrequency coding, and to automatically introduce appropriate measures to control the error. Since the voting or evaluation is undertaken using an N-out-of-K evaluation, thus, for example, three subscribers equal N and two inputs or transmission paths per subscriber equal K, depending on the choice of N and K, there may be a reliable reaction when working with a specific number of errors. Thus, in the example according to FIG. 1, a voter structure arises for a K-out-of-4 voting, in particular 3-out-of-4 voting, when, for example, two network errors are allowed.

The two network errors arise since, at a maximum, three inputs and thus three transmission paths are available and, thus, given two occurring network errors either on the transmission paths or in subscribers, a correct frame with corresponding information is nevertheless available. Since, because of the transmission paths, subscribers are skipped and, in some circumstances, the data of these subscribers is not up-to-date or is incorrect, it is conceivable in accordance with the present invention for a correction to be made and for the appropriate frame to be retransmitted to the subscriber in question for the information to be corrected accordingly. This may be simplified using status information in the frame, so that, in the case of a correction, the correction status information is recognized. Other status information includes, for example, initial for initialization, enter for data input, distribute for data distribution, master lost for serious master errors and loss of the master function of this subscriber, ready, empty, fault-free, thus perfect transmission, error, data equal or data not equal, when this is already known from the outset, as well as test in the case of a test operation. Thus, on the basis of status information, not only the status of the network itself may be recognized from any node at all, but the active status of each subscriber may also be recognized when the distinction is made between network status and subscriber status. Thus, status information may be used for transmission paths, for subscribers, or for the entire network, which, at the same time, enhances the evaluation capacity or evaluation security and accuracy, since, for example, given an indication of "data not equal" in a parity comparison of two informational components, this must be considered.

In addition to the status information, it is also possible to transmit control information, for example for controlling the transmission by a master.

Thus, for example, the error "master lost", in other words the failure of the master, is very serious. This failure of the master may be recognized, for example, on the basis of the status information, in particular in conjunction with the data information. In the same way, individual or all error mechanisms, as described above, may be used. If, at this point, the master should fail, then, as a reaction to the error, another subscriber, in particular the next subscriber to follow, may assume the master function. This presupposes that this following master has either an independent clock pulse, for example from the application, or its own clock-pulse generator, in order to be able to drive the data when it is necessary to take over the master function, since, as described, the master presets the clock pulse, in particular in the frame. Another possibility for extracting the clock pulse is to use the clock-pulse base of application circuits which, in some instances, are connected to the output interface. The frequency is adaptable to the required network frequency using frequency division or frequency multiplication (e.g., PLL). A PLL is required in any case for each non-master network subscriber (slave), provided that the clock pulse is not additionally transmitted via a separate line, but must be recovered from the data. For the case that the clock pulse is not able to be recovered, a parallel clock-pulse transmission from the master to all slaves or to all further subscribers is also possible. This clock-pulse transmission must be undertaken similarly to the data transmission, thus the information transmission, via a plurality of parallel lines, with automatic replacement of failed clock-timing circuits.

On the basis of the aforementioned possibilities, various programming may be used to adapt simply to every configuration and every evaluation scale.

Thus, a test of the transmission paths or of the subscribers may be performed in that they are designated as being faulty, thus errors are explicitly incorporated. Such a test may also be carried out periodically and cyclically in that all subscribers are tested one after another or in accordance with certain reference patterns. Thus, in this test, the information of a frame is stored, for example in a memory device comparable to 211, then evaluated and, if indicated, modified, and retransmitted within the frame of the test as information that has been modified to be faulty. The result is that, even in the test, the next node or subscriber receives the information as information that is delayed by two frames, for example. Here, as well, the synchronization may be carried out to an event to be evaluated, in this case the test result, in particular on the basis of the identification at the beginning of a frame, it being possible, moreover, for a unique time reference to the master to likewise be established by the subscriber position within the frame of the test. This test may be controlled, for example, by the master, for example using control information or control bytes in the frame, in particular using appropriate test status information. Within the frame of this test, it is then checked whether, in the network, there is an adequate reaction to the error, thus to the introduced measure in question. This measure may be predefined as a function of the type of error, which may be recognized on the basis of various, above mentioned evaluation criteria. On the one hand, as mentioned above, a correction may be made. On the other hand, faulty subscribers or transmission paths may either be permanently excluded by blocking or switching them off, or by discarding data, or also, experimentally, be incorporated again, which likewise may be represented by transmitted status information. Individual transmission paths or subscribers may be blocked or switched off, for example, using selection device 203, when it receives the instruction from evaluation device 204 to no longer select certain inputs. Via selection device 203, the number of considered inputs is able to be preset or programmed. Thus, in the example, any desired number, up to the maximum number of three inputs may be used, in this case, employing a redundancy principle, two or three inputs.

In general terms, a voter structure or an evaluation method is established, including N subscribers and K transmission paths, where K<N, which, in spite of substantial configurability, makes do with comparably few and short connections, thus transmission paths. In this context, during transmission, the frames or the information, to the extent that they lead via the subscriber, are stored in the same and transmitted further, if indicated temporarily in the permitted informational fields, having been modified or adapted or, under test conditions, intentionally manipulated. A resultant delay may be controlled through the use of an identifier, as described, as the result of the allocation of the frames thereby rendered possible. The first data to arrive in time are temporarily stored for purposes of a comparison until the comparison data are available.

In this way, a voting structure is provided for distributed, multiply redundant, safety-related systems, which features an adjustable redundancy as well as substantial flexibility and configurability.

What is claimed is:

1. A method for transmitting information in a network including at least three subscribers, comprising:
    transmitting, from a first subscriber, the information in at least a first frame of a predefined length and structure;
    transmitting the first frame on a first transmission path in a loop to a next, second subscriber in each instance in accordance with a predefined transmission direction;
    additionally transmitting, from the first subscriber, the information in a second frame having the same length and same structure as the first frame;
    transmitting the second frame on a second transmission path to a third subscriber that is after the second subscriber, the second transmission path and the second frame skipping the second subscriber; and
    performing an assessment in dependence upon at least one criterion corresponding to one of the information, the predefined length, and the structure, wherein the assessment includes at least partially comparing at least one of the information, the predefined length and the predefined structure of the first frame to corresponding at least one of the information, the predefined length and the predefined structure of the second frame, and determining a presence of an error if the at least partial comparison results in a deviation.

2. The method as recited in claim 1, wherein:
    each of the first frame and the second frame contains first informational fields corresponding to a number of the at least three subscribers, each of the at least three subscribers being uniquely assigned one of the first informational fields.

3. The method as recited in claim 1, wherein:
    the information is at least differentiated as data information and validity information, and
    given existing validity information and lack of data information, a presence of an error is decided during an evaluation.

4. The method as recited in claim 1, wherein:
    each of the first frame and the second frame includes a piece of identifier information that uniquely characterizes the respective one of the first frame and the second frame, and
    the first frame and the second frame have the same identifier information.

5. The method as recited in claim 1, further comprising:
    comparing at least one of the structure and the length of one of the first frame and the second frame to at least one of a respective predefined structure and predefined length,
    if the comparing detects a deviation, determining that an error is present.

6. The method as recited in claim 1, further comprising:
    transmitting the information in one of a bifrequency coding and another coding, so that, independently of a content of the information, signals are continually transmitted on the network, and, in response to an absence of the signals on at least one of the first transmission path and the second transmission path, a presence of an error is decided.

7. The method as recited in claim 6, :
    the other coding includes block code coding, in which elements having constant levels—all 0 or all 1—are not code words.

8. The method as recited in claim 3, further comprising:
    if the error is determined to be present, one of switching off and blocking an information input of at least one of the at least three subscribers, so that the information and the respective one of the first frame and the second frame are only transmitted over another transmission path.

9. The method as recited in claim 3, further comprising:
as a functional test, predefining at least one of the at least three subscribers as a faulty subscriber in that the at least one criterion is transmitted as an at least partially altered datum by the at least one of the at least three subscribers predefined as the faulty subscriber.

10. The method as recited in claim 1, further comprising:
providing a master subscriber that exercises a master function and controls a transmission of the information in the network, in that the master subscriber generates at least one frame and specifies a clock-pulse frequency of the information.

11. The method as recited in claim 3, wherein:
if it is decided that the error are present in a master subscriber, then a next subscriber assumes a master function.

12. The method as recited in claim 1, wherein:
the information includes at least control information and data information, the control information being used to control a transmission of the first frame and the second frame.

13. The method as recited in claim 1, wherein:
the information includes at least status information that describes a network status, the status information corresponding to one of an active network status and to being based on a corresponding frame.

14. The method as recited in claim 13, wherein:
the status information corresponds to at least one piece of connection information representing a status of a predefinable transmission path.

15. The method as recited in claim 1, wherein:
the at least three subscribers includes at least four subscribers,
a third frame having the same length and structure as the first frame and the second frame is transmitted from the first subscriber, skipping the second and third subscribers,
the fourth subscriber receives a transmission of the first frame from the second subscriber, the second frame from the third subscriber, and the third frame from the first subscriber; and
the assessment includes at least partially comparing a) at least one of the information, the predefined length and the predefined structure of the first frame, b) corresponding at least one of the information, the predefined length and the predefined structure of the second frame, and c) corresponding at least one of the information, the predefined length and the predefined structure of the third frame to each, and determining a presence of an error if the at least partial comparison results in a deviation.

16. The method as recited in claim 1, wherein:
each subscriber has a specific first number of inputs which corresponds to a number of transmission paths to the particular subscriber, and
from the specific first number of inputs, any desired second number of inputs is able to be one of switched off and blocked.

17. A device for transmitting information in a network including at least three subscribers, comprising:
an arrangement for transmitting, from a first subscriber, the information in at least a first frame of a predefined length and structure;
an arrangement for transmitting the first frame on a first transmission path in a loop to a next, second subscriber in each instance in accordance with a predefined transmission direction;
an arrangement for additionally transmitting, from the first subscriber, the information in a second frame having the same length and same structure as the first frame;
an arrangement for transmitting the second frame on a second transmission path to a third subscriber that is after the second subscriber, the second transmission path and the second frame skipping the second subscriber; and
an arrangement for performing an assessment in dependence upon at least one criterion corresponding to one of the information, the predefined length, and the structure, wherein the assessment includes at least partially comparing at least one of the information, the predefined length and the predefined structure of the first frame to corresponding at least one of the information, the predefined length and the predefined structure of the second frame, and determining a presence of an error if the at least partial comparison results in a deviation.

18. The device as recited in claim 17, wherein the at least three subscribers includes at least four subscribers, the device further comprising:
an arrangement for transmitting a third frame having the same length and structure as the first frame and the second frame;
an arrangement for causing the fourth subscriber to receive a transmission of the first frame from the third subscriber, the second frame from the second subscriber, and the third frame from the first subscriber; and
an arrangement through which, at the second frame, the third subscriber is skipped, and at the third frame, the second and third subscribers are skipped.

19. The device as recited in claim 17, wherein:
each subscriber has a specific first number of inputs which corresponds to a number of transmission paths to the particular subscriber, and
from the specific first number of inputs, any desired second number of inputs is able to be one of switched off and blocked.

* * * * *